US011153188B2

(12) United States Patent
Zhao et al.

(10) Patent No.: US 11,153,188 B2
(45) Date of Patent: Oct. 19, 2021

(54) SERVICE IDENTIFICATION METHOD AND APPARATUS, AND NETWORK DEVICE

(71) Applicant: Huawei Technologies Co., Ltd., Shenzhen (CN)

(72) Inventors: Linhua Zhao, Wuhan (CN); Wenming Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/906,827

(22) Filed: Jun. 19, 2020

(65) Prior Publication Data
US 2020/0322247 A1 Oct. 8, 2020

Related U.S. Application Data

(63) Continuation of application No. PCT/CN2018/101125, filed on Aug. 17, 2018.

(30) Foreign Application Priority Data

Dec. 21, 2017 (CN) .......................... 201711396118.0

(51) Int. Cl.
*H04L 12/26* (2006.01)
*H04L 29/08* (2006.01)

(52) U.S. Cl.
CPC ........ *H04L 43/0864* (2013.01); *H04L 43/026* (2013.01); *H04L 43/04* (2013.01);
(Continued)

(58) Field of Classification Search
CPC ... H04L 43/0864; H04L 43/026; H04L 43/04; H04L 43/062; H04L 43/0894; H04L 43/12; H04L 43/16; H04L 67/14
See application file for complete search history.

(56) References Cited

U.S. PATENT DOCUMENTS 7,545,748 B1 * 6/2009 Riddle .................... H04L 43/08
370/230
7,554,983 B1 6/2009 Muppala
(Continued)

FOREIGN PATENT DOCUMENTS

CN 101026502 A 8/2007
CN 101399749 A 4/2009
(Continued)

OTHER PUBLICATIONS

Sung-Min Kim, "A Method for Service Identification of SSL/TLS Encrypted Traffic with the Relation of Session ID and Server IP", pp. 487-490, IEEE Xplore; 2015 (Year: 2015).*
(Continued)

*Primary Examiner* — Jerry B Dennison
(74) *Attorney, Agent, or Firm* — Conley Rose, P.C.

(57) ABSTRACT

A service identification method and a network device, where the method includes receiving, by the network device, service packets and identifying service packets that belong to a same terminal, determining, by the network device, a service traffic feature based on session information of the terminal and packet information of the service packet, where the service traffic feature includes at least one of session duration, a quantity of concurrent sessions, a traffic rate, traffic rate stability, a packet transmit/receive frequency, a quantity of packets, a packet length, or a round-trip time related to a request packet and a response packet, and determining, by the network device, a service type of a to-be-identified service based on the service traffic feature.

20 Claims, 6 Drawing Sheets

(52) U.S. Cl.
CPC ........ *H04L 43/062* (2013.01); *H04L 43/0894* (2013.01); *H04L 43/12* (2013.01); *H04L 43/16* (2013.01); *H04L 67/14* (2013.01)

(56) References Cited

U.S. PATENT DOCUMENTS

| | | | |
|---|---|---|---|
| 8,045,458 B2* | 10/2011 | Alperovitch | H04L 47/2433 370/230 |
| 2007/0058557 A1* | 3/2007 | Cuffaro | H04L 43/087 370/252 |
| 2010/0034102 A1 | 2/2010 | Wang et al. | |
| 2010/0132031 A1 | 5/2010 | Zheng | |
| 2011/0314145 A1* | 12/2011 | Raleigh | H04L 41/0893 709/224 |
| 2017/0012872 A1* | 1/2017 | Chao | H04L 45/586 |
| 2017/0230469 A1 | 8/2017 | Cherian et al. | |
| 2018/0176308 A1* | 6/2018 | Tsai | H04L 45/38 |
| 2020/0274812 A1* | 8/2020 | Ouyang | H04L 63/0428 |
| 2020/0322247 A1* | 10/2020 | Zhao | H04L 67/14 |

FOREIGN PATENT DOCUMENTS

| | | |
|---|---|---|
| CN | 101645806 A | 2/2010 |
| CN | 102111814 A | 6/2011 |
| CN | 102315974 A | 1/2012 |
| CN | 104348638 A | 2/2015 |
| WO | 2017125137 A1 | 7/2017 |

OTHER PUBLICATIONS

Yang, P., "F.SATC "Scenarios and requirements for service awareness and traffic control": Updated draft," International Telecommunication Union, Study Group 16, TD 379 (WP 2/16), Geneva, Jul. 19-30, 2010, 22 pages.

* cited by examiner

SERVICE IDENTIFICATION METHOD AND APPARATUS, AND NETWORK DEVICE

CROSS-REFERENCE TO RELATED APPLICATIONS

This application is a continuation of International Patent Application No. PCT/CN2018/101125 filed on Aug. 17, 2018, which claims priority to Chinese Patent Application No. 201711396118.0 filed on Dec. 21, 2017. The disclosures of the aforementioned applications are hereby incorporated by reference in their entireties.

TECHNICAL FIELD

This application relates to the field of communications network technologies, and in particular, to a service identification method and apparatus, and a network device.

BACKGROUND

A small local area network (LAN) such as a home network includes various terminals that access a service network using a network device, for example, a gateway, to access various services. Different types of services have different requirements for quality of service. For example, a voice service and a game service require a low latency, and a video service requires both a low latency and a low packet loss rate. When network resources are limited, a network device needs to identify service types and preferentially ensure quality of service of a critical service.

Currently, a terminal may add service identification information to a packet sent by the terminal. For example, the terminal device adds a specific virtual LAN (VLAN) identifier to the packet to indicate a service type, and the network device can identify the service type based on the specific VLAN identifier. However, the method cannot be applied to some terminals that cannot add service identification information to a packet.

The network device may identify a service type using specific service identification information carried in a packet. Alternatively, the network device may parse encapsulation information of a service packet to identify a service type. The encapsulation information includes port information, a source address, a destination address, an application protocol, and the like. However, efficiency of identifying a service type through packet parsing is comparatively low, which is mainly reflected in the following aspects. 1. For a new service type, manual configuration or even an upgrade of the network device is required, to enable the network device to have a capability of parsing the new type of service. 2. A service packet transmitted using an encryption protocol or a proprietary protocol fails to be parsed. 3. For a service that masquerades as a Hypertext Transfer Protocol (HTTP) service using port information, the network device needs to parse the port information and further deeply analyze an application layer protocol and configuration, increasing difficulty in identification and configuration. 4. Service identification accuracy is comparatively low. For example, for a web page that supports both a video on demand (VOD) service and a web browsing service, a VOD service may be mistakenly identified as a web browsing service due to a same destination address of the two services.

SUMMARY

Embodiments of this application provide a service identification method and apparatus, and a network device, to resolve a technical problem that efficiency of identifying a service type based on a packet parsing result is comparatively low.

To achieve the foregoing objective, the embodiments of this application provide the following technical solutions.

According to a first aspect, a service identification method is provided, where the method is applied to a network device. The method includes receiving, by a network device, service packets and identifying service packets that belong to a same terminal, and determining a service traffic feature based on session information of the terminal and packet information of the service packet. The network device then determines a service type of a to-be-identified service based on the service traffic feature.

The service traffic feature includes at least one of session duration, a quantity of concurrent sessions, a traffic rate, traffic rate stability, a packet transmit/receive frequency, a quantity of packets, a packet length, and a round-trip time related to a request packet and a response packet.

For example, a session refers to a communication connection between the terminal and a service network. The quantity of concurrent sessions is a quantity of connections between a same terminal and the service network, and may include a quantity of uplink concurrent sessions and a quantity of downlink concurrent sessions. The session duration is a time period from a session start time to a session end time.

For example, traffic refers to a data volume transmitted between the terminal and the service network, and may be measured using indicators such as a quantity of bytes or a quantity of bits. The traffic rate refers to a data volume of service packets received or sent by the terminal within a specified time period, includes an uplink traffic rate and a downlink traffic rate, and may be measured in a quantity of bytes or bits received or sent per unit time. The traffic rate stability refers to stability of a traffic rate, for example, may be measured in a variance of traffic rates measured at a plurality of time points within a specified time period.

For example, the packet is a data packet transmitted between the terminal and the service network. The packet quantity may include a quantity of uplink large packets, a quantity of downlink large packets, a quantity of uplink small packets, a quantity of downlink small packets, and a total quantity of all received and sent packets. The packet length refers to a size of the service packet, and is usually measured in a quantity of bytes or bits. Similarly, a first packet ratio is a ratio of the quantity of downlink large packets to a total quantity of downlink packets, and a second packet ratio is a ratio of the quantity of downlink small packets to a total quantity of downlink packets. A large packet may usually be a packet whose packet length is greater than a first packet length threshold, a small packet may be a packet whose packet length is less than a second packet length threshold, and the second packet length threshold is less than the first packet length threshold. The packet transmit/receive frequency refers to a quantity of packets received and/or sent within a specified time period, for example, may be measured in a quantity of packets received and sent per unit time. The round-trip time refers to a time delay from sending a service request packet by the terminal to receiving a response packet of the service request packet by the terminal.

Optionally, the service traffic feature further includes a service occurrence time period, for example, in the early morning, morning, noon, afternoon, and night. The service traffic feature further includes a frequently used service type of the terminal. For example, if a user often uses a terminal to play an online game or perform bit torrent (BT) downloading, frequently used service types corresponding to the terminal include an online game service and a BT download service. The service traffic feature further includes a service occurrence place, for example, home and a public small LAN, for example, an internet cafe or school.

In the foregoing service identification method, the network device can determine, through analysis on the session information of the terminal and the packet information of the service packet, a traffic feature of a service currently accessed by the terminal, and then can determine a service type of the to-be-identified service based on the service traffic feature. It can be learned that the network device does not need to perform complex parsing on the service packet, so that service identification efficiency can be improved. This is mainly reflected in the following aspects. 1. For a newly added service, the network device does not need to be upgraded for a capability of parsing a new network transmission protocol used by the newly added service, but only needs to establish a relatively simple service traffic analysis model for the newly added service to identify the newly added service. This can reduce deployment costs of the small LAN. 2. For a service packet encapsulated using an encryption protocol or a proprietary protocol, the network device can identify a traffic feature of a service and determine a service type of the to-be-identified service without parsing the service packet based on the encryption protocol or the proprietary protocol. 3. For another service packet that masquerades as an HTTP protocol packet using port information, a traffic feature of a service can be identified and a service type of the to-be-identified service can be determined without performing a complex parsing step such as application layer encapsulation information parsing on the service packet. 4. For a VOD service and a web browsing service with a same destination address, traffic features can be used for identification to avoid mistaken determining. In addition, according to the method, a terminal does not need to have a capability of adding service identification information to a packet. Therefore, the method can be applied to any type of terminal.

In a possible design, determining, by the network device, a service type of the to-be-identified service based on the service traffic feature includes obtaining, by the network device, a traffic analysis model corresponding to a preset service type, where the traffic analysis model includes a decision condition for the service traffic feature and a weight corresponding to the decision condition, for the decision condition in the traffic analysis model, if the service traffic feature meets the decision condition, determining, by the network device, a score of the decision condition base on a first score corresponding to the decision condition, or if the service traffic feature does not meet the decision condition, determining, by the network device, a score of the decision condition base on a second score corresponding to the decision condition, and calculating, by the network device, a corresponding total score of the traffic analysis model based on the weight and the score that correspond to the decision condition in the traffic analysis model, and determining the service type of the to-be-identified service based on the corresponding total score of the traffic analysis model.

The traffic analysis model includes the decision condition for the service traffic feature and the weight corresponding to each decision condition, and the second score is less than the first score. The corresponding total score of the traffic analysis model is calculated according to the following formula:

$$S_i = \sum_{j=1}^{N}(s_{i,j} \times \alpha_{i,j}),$$

where $S_i$ is a total score of an $i^{th}$ traffic analysis model, $s_{i,j}$ is a score of a $j^{th}$ decision condition in the $i^{th}$ traffic analysis model, $\alpha_{i,j}$ is a weight of the $j^{th}$ decision condition in the $i^{th}$ traffic analysis model, $1 \leq i \leq M$, $1 \leq j \leq N$, and both M and N are natural numbers greater than or equal to 2.

Optionally, the foregoing method may be applied to a scenario of determining whether the service type of the to-be-identified service is a specific preset service type. The preset service type may be a service type that concerns the user or a network administrator. The network device stores a traffic analysis model corresponding to the service type. Correspondingly, determining, by the network device, the service type of the to-be-identified service based on the corresponding total score of the traffic analysis model includes if the corresponding total score of the traffic analysis model is greater than a preset score threshold, determining, by the network device, that the service type of the to-be-identified service is a service type corresponding to the traffic analysis model.

Optionally, the foregoing method may be applied to a scenario of determining whether the to-be-identified service is any one of a plurality of preset service types. The network device stores traffic analysis models corresponding to a plurality of service types. Correspondingly, obtaining, by the network device, a traffic analysis model corresponding to a preset service type includes obtaining, by the network device, traffic analysis models corresponding to at least two preset service types, where the preset service types are in a one-to-one correspondence with the traffic analysis models. Correspondingly, determining, by the network device, the service type of the to-be-identified service based on the corresponding total score of the traffic analysis model includes determining, by the network device, that the service type of the to-be-identified service is a preset service type corresponding to a traffic analysis model with a maximum total score.

Common service types include BT download service, a VOD service, a voice service, and an online game service.

The BT download service has features of a high downlink traffic rate but poor stability, a low uplink traffic rate, a large quantity of uplink sessions, and long session duration. Therefore, for example, a decision condition in a traffic analysis model corresponding to the BT download service includes the following. The downlink traffic rate is greater than a preset first rate threshold, and the quantity of uplink concurrent sessions is greater than a preset session quantity threshold, the session duration is greater than a preset duration threshold, a value of the downlink traffic rate stability is greater than a preset stability threshold, and the uplink traffic rate is less than a preset second rate threshold, and the second rate threshold is less than the first rate threshold. For example, the first rate threshold is usually set to a relatively large value, for example, 10 megabits per second (Mbps), and the second rate threshold is usually set to a relatively small value, for example, 200 kilobits per second (kbps).

Optionally, to further improve accuracy of identifying the BT download service, the decision condition in the traffic analysis model corresponding to the BT download service further includes at least one of the service occurrence time period is in the early morning, or the frequently used service type of the terminal includes the BT download service.

The VOD service typically has features of a high and stable downlink traffic rate, a low uplink traffic rate, a small quantity of uplink sessions, long session duration, and a high proportion of packets with a large downlink packet length in all service packets. Therefore, for example, a decision condition for a traffic analysis model corresponding to the VOD service includes the following. The downlink traffic rate is greater than the preset first rate threshold, and the quantity of uplink concurrent sessions is less than the preset session quantity threshold, the first packet ratio is greater than a preset large packet ratio threshold, the uplink traffic rate is less than the preset second rate threshold, the session duration is greater than the preset duration threshold, and a value of the downlink traffic rate stability is less than the preset stability threshold. The first packet ratio is the ratio of the quantity of downlink large packets to the total quantity of downlink packets.

Optionally, to further improve accuracy of identifying the VOD service, the decision condition in the traffic analysis model corresponding to the VOD service further includes that the service occurrence time period is in the night.

The voice service has features of small uplink and downlink traffic, a large proportion of downlink small packets, a high uplink packet transmit frequency, high real-time performance, and a stable downlink rate. Therefore, for example, a decision condition for a traffic analysis model corresponding to the voice service includes the following. The uplink packet transmit frequency is greater than a preset frequency threshold, the downlink traffic rate is less than a preset third rate threshold, and the second packet ratio is greater than a preset second packet ratio threshold, a value of the round-trip time is less than a preset delay threshold, the quantity of uplink concurrent sessions is less than the preset session quantity threshold, and a value of the downlink traffic rate stability is less than the preset stability threshold. The third rate threshold is less than the first rate threshold, and the second packet ratio is the ratio of the quantity of downlink small packets to the total quantity of downlink packets.

The online game service has features of low uplink and downlink traffic rates, a low uplink packet transmit frequency, high real-time performance, and a small quantity of uplink concurrent sessions. Therefore, for example, a decision condition for a traffic analysis model corresponding to the online game service includes the downlink traffic rate is less than the preset third rate threshold, and the second packet ratio is greater than the preset second packet ratio threshold, the uplink packet transmit frequency is less than the preset frequency threshold, a value of the round-trip time is less than the preset delay threshold, the quantity of uplink concurrent sessions is less than the preset session quantity threshold, and a value of the downlink traffic rate stability is less than the preset stability threshold, where the third rate threshold is less than the first rate threshold, and the second packet ratio is the ratio of the quantity of downlink small packets to the total quantity of downlink packets.

Optionally, to further improve accuracy of identifying the online game service, the decision condition for the traffic analysis model corresponding to the online game service further includes at least one of the service occurrence place is a public small LAN, or the frequently used service type of the terminal includes the online game service.

According to a second aspect, a service identification apparatus is provided, where the apparatus is applied to a network device. The apparatus includes a receiving module configured to receive service packets and identify service packets that belong to a same terminal, a processing module configured to determine a service traffic feature based on session information of the terminal and packet information of the service packet, where the service traffic feature includes at least one of session duration, a quantity of concurrent sessions, a traffic rate, traffic rate stability, a packet transmit/receive frequency, a quantity of packets, a packet length, and a round-trip time related to a request packet and a response packet, where the processing module is further configured to determine a service type of the to-be-identified service based on the service traffic feature.

In a possible design, the processing module is further configured to obtain a traffic analysis model corresponding to a preset service type, and determine, based on a determining result of each decision condition in the traffic analysis model, a score corresponding to the decision condition. For example, if the service traffic feature meets the decision condition, the score corresponding to the decision condition is determined as a first score. For another example, if the service traffic feature does not meet the decision condition, the score corresponding to the decision condition is determined as a second score. The processing module then calculates a corresponding total score of the traffic analysis model based on a weight and the score that correspond to the decision condition in the traffic analysis model, and determines the service type of the to-be-identified service based on the corresponding total score of the traffic analysis model.

The traffic analysis model includes the decision condition for the service traffic feature and the weight corresponding to the decision condition, and the second score is less than the first score. The corresponding total score of the traffic analysis model is calculated according to the following formula:

$$S_i = \sum_{j=1}^{N} (s_{i,j} \times \alpha_{i,j}),$$

where $S_i$ is a total score of an $i^{th}$ traffic analysis model, $s_{i,j}$ is a score of a $j^{th}$ decision condition in the $i^{th}$ traffic analysis model, $\alpha_{i,j}$ is a weight of the $j^{th}$ decision condition in the $i^{th}$ traffic analysis model, $1 \leq i \leq M$, $1 \leq j \leq N$, and both M and N are natural numbers greater than or equal to 2.

Optionally, the processing module is further configured to if the corresponding total score of the traffic analysis model is greater than a preset score threshold, determine that the service type of the to-be-identified service is a service type corresponding to the traffic analysis model.

Optionally, the processing module is further configured to obtain traffic analysis models corresponding to at least two preset service types, and determine that the service type of the to-be-identified service is a preset service type corresponding to a traffic analysis model with a maximum total score, where the preset service types are in a one-to-one correspondence with the traffic analysis models.

According to a third aspect, a network device is provided, where the network device includes a processor, a communications interface, and a memory. The memory is configured to store a computer-executable instruction. When the network device runs, the processor executes the computer-executable instruction stored in the memory, so that the network device performs the service identification method according to any one of the first aspect and the possible implementations of the first aspect.

According to a fourth aspect, a computer-readable storage medium is provided. The computer readable storage medium stores an instruction. When the instruction is run on a network device, the network device is enabled to perform the service identification method according to any one of the first aspect and the possible implementations of the first aspect.

According to a fifth aspect, a computer program product including an instruction is provided. When the computer program product runs on a network device, the network device is enabled to perform the service identification method according to any one of the first aspect and the possible implementations of the first aspect.

In the embodiments of this application, names of units and modules in the network device do not constitute a limitation on the device. In actual implementation, these units and modules may have other names provided that functions of the units and modules are similar to those in the embodiments of this application, that is, the units and modules fall within the scope of the claims of this application and equivalent technologies thereof.

DESCRIPTION OF EMBODIMENTS

The following describes in detail, with reference to the accompanying drawings, a service type identification method and apparatus, and a network device that are provided in the embodiments of this application.

The term "and/or" in this specification describes only an association relationship for describing associated objects and indicates that three relationships may exist. For example, A and/or B may indicate the following three cases: only A exists, both A and B exist, and only B exists.

In the specification and the accompanying drawings of this application, the terms "first", "second", and the like are intended to distinguish between different objects or distinguish between different processing of a same object but are not intended to describe a specific order of the objects.

In addition, the terms "including", "having", or any other variant thereof mentioned in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device.

It should be noted that, in the embodiments of this application, the word "exemplary" or "for example" is used to represent giving an example, an illustration, or a description. Any embodiment or design described as an "exemplary" or "for example" in the embodiments of this application should not be interpreted as being more preferred or having more advantages than another embodiment or design. Exactly, use of the word "exemplary" or "example" or the like is intended to present a relative concept in a specific manner.

The service type identification method and apparatus, and the network device that are provided in the embodiments of this application may be applied to a small LAN. The small LAN provides a network service mainly for a user in the small LAN. For example, the small LAN may be a home LAN, or may be a public small LAN deployed in a small area, for example, an internet cafe or a school. The following uses a home network 10 as an example for description.

Figure 1:
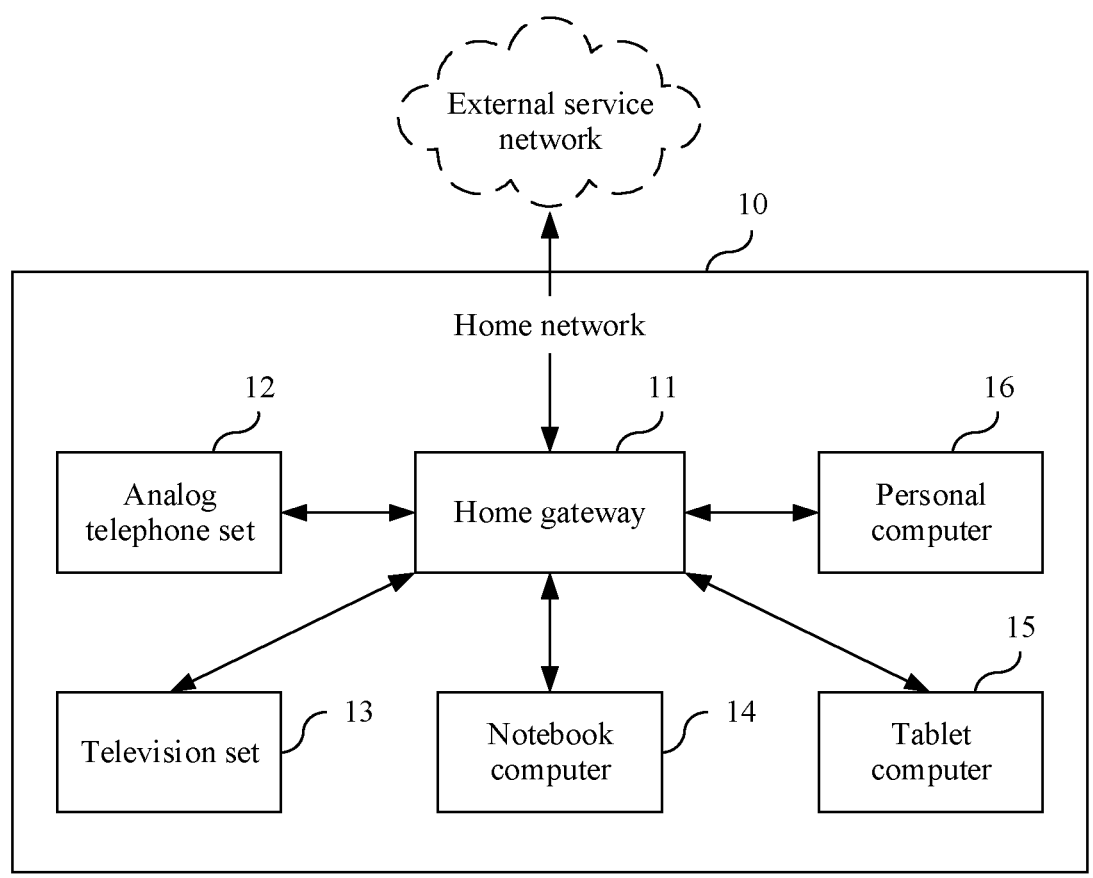
FIG. 1 is a schematic structural diagram of a communications network, according to an embodiment of this application, to which a service identification method and apparatus and a network device are applied.

As shown in FIG. 1, the home network 10 includes a home gateway 11 and a plurality of terminals 12 to 16 that can access an external service network using the home gateway 11. The home gateway 11 may be a network device such as an optical network terminal (ONT), or a small router. The terminal 12 is an analog telephone set, the terminal 13 is a television set connected to a set-top box (STB, which is not shown in FIG. 1), the terminal 14 is a notebook computer, the terminal 15 is a tablet computer, and the terminal 16 is a desktop personal computer (PC). In addition, the terminal may also be a mobile phone, a cellular phone, a cordless phone, a Session Initiation Protocol (SIP) phone, a smartphone, a wireless local loop (WLL) station, a personal digital assistant (PDA), a handheld communications device, a handheld computing device, a satellite wireless device, a wireless modem card, a customer-premises equipment (CPE), and/or another device configured to communicate with the external service network using the home gateway 11.

In the home network 10 shown in FIG. 1, a plurality of family members may simultaneously access the service network using the plurality of terminals, to receive different types of network services. For example, a family member A watches, using the television set 13 connected to the STB, a video program provided by a VOD website, a family member B uses a plain old telephone (POT) 12 to make a call, a family member C uses the PC 16 to play an online game, and a family member D uses the notebook computer 14 to download a movie using a BT downloading tool. Different types of services have different requirements for quality of service. For example, a voice service (a call) and an online game service require a low latency, and a VOD service requires both a low latency and a low packet loss rate. When network resources cannot meet the quality requirements of all the services, the home gateway 11 needs to identify priorities of the different types of services, and preferentially ensure quality of service of a high-priority service. For example, when minimum network bandwidth required by all the services already exceeds network bandwidth configured by an operator for the home network, quality of service of the voice service, the VOD service, and the online game service needs to be preferentially ensured.

Figure 2:
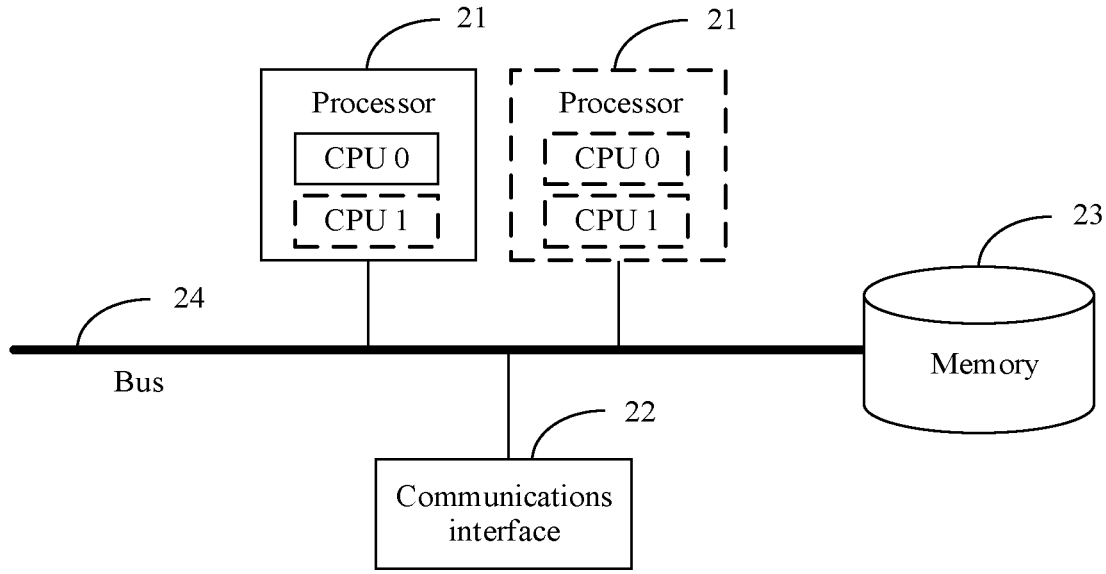
FIG. 2 is a schematic structural diagram of a network device according to an embodiment of this application.

FIG. 2 is a schematic structural diagram of a network device according to an embodiment of this application. The network device may be a small network device, for example, the home gateway 11 shown in FIG. 1. As shown in FIG. 2, the network device may include at least one processor 21, a communications interface 22, a memory 23, and a bus 24.

The following describes composition components of the network device in detail with reference to FIG. 2.

The processor 21 is a control center of the network device, and may be one processor or may be a collective name for a plurality of processing elements. During specific implementation, in an embodiment, the processor 21 may include one or more central processing units (CPU), for example, a CPU 0 and a CPU 1 shown in FIG. 2. Alternatively, the processor 21 may be an application-specific integrated circuit (ASIC), or one or more integrated circuits configured to implement the embodiments of this application, for example, one or more digital signal processors (DSP), or an integrated circuit set including one or more field programmable gate arrays (FPGA).

For example, the processor 21 includes one or more CPUs. The processor 21 may perform various functions of the network device by running or executing a software program stored in the memory 23 of the network device and invoking data stored in the memory 23.

During specific implementation, in an embodiment, the network device may include a plurality of processors, for example, two processors 21 shown in FIG. 2. Each of the processors may be a single-core processor or may be a multi-core processor. The processor herein may refer to one or more devices, circuits, and/or processing cores configured to process data (for example, a computer program instruction).

In the embodiments of this application, the processor 21 is mainly configured to obtain service packets that belong to a same terminal and session information of the terminal, obtain a service traffic feature of the to-be-identified service based on the service packet and the session information, and further determine a service type of a to-be-identified service based on the service traffic feature.

The memory 23 may be a read-only memory (ROM) or another type of static storage device that can store static information and an instruction, or a random-access memory (RAM) or another type of dynamic storage device that can store information and an instruction. The memory 23 may alternatively be an electrically erasable programmable ROM (EEPROM), a compact disc (CD) ROM (CD-ROM) or another compact disc storage, optical disc storage (including a compact disc, a laser disc, an optical disc, a digital versatile disc (DVD), a BLU-RAY DISC, or the like), a magnetic disk storage medium or another magnetic storage device, or any other medium that can be used to carry or store expected program code in a form of an instruction or a data structure and that is accessible by a computer, but is not limited thereto. The memory 23 may exist independently, and is connected to the processor 21 using the bus 24. The memory 23 may alternatively be integrated with the processor 21.

The memory 23 may include a program storage area configured to store a program instruction for executing the solutions of this application, and the execution is controlled by the processor 21. In addition, the memory 23 may further include a data storage area configured to buffer a received service packet and intermediate data generated in a process of performing the service identification method provided in the embodiments of this application.

The communications interface 22 is configured to communicate with another device or communications network, for example, the Ethernet, a radio access network (RAN), or a WLAN. The communications interface 22 may include a receiving unit for implementing a receiving function, and a sending unit for implementing a sending function. In the embodiments of this application, the communications interface is mainly configured to receive or send a service packet.

The bus 24 may be an Industry Standard Architecture (ISA) bus, a Peripheral Component Interconnect (PCI) bus, an Extended ISA (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The device structure shown in FIG. 2 does not constitute a limitation on the network device. The network device may include more or fewer components than those shown in FIG. 2, or combine some components, or have a different component arrangement.

Figure 3:
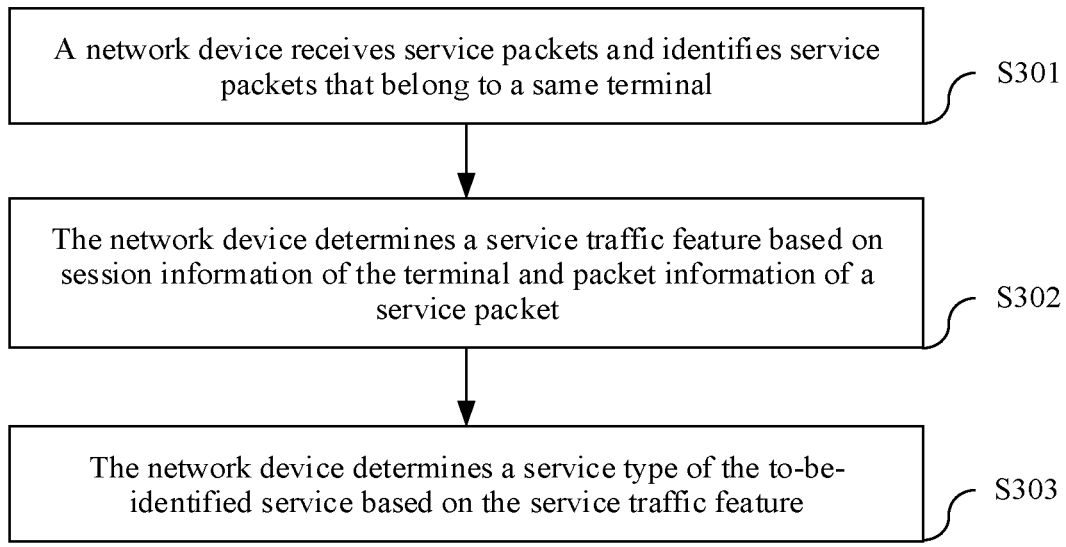
FIG. 3 is a schematic flowchart of a service identification method according to an embodiment of this application.

An embodiment of this application provides a service identification method. The method may be applied to the LAN shown in FIG. 1 and the network device shown in FIG. 2. As shown in FIG. 3, the method includes S301 to S303.

S301. A network device receives service packets and identifies service packets that belong to a same terminal.

The network device may perform S301 using the communications interface 22 shown in FIG. 2.

In actual application, the network device may identify, based on information such as source port identifiers and source media access control (MAC) addresses that are carried in uplink service packets, uplink service packets that belong to the same terminal. Alternatively, the network device may further identify, based on information such as destination port identifiers and destination MAC addresses that are carried in downlink service packets, downlink service packets that belong to the same terminal.

It should be noted that the uplink service packet is a packet sent by the terminal to an external service network via the network device, for example, a service request packet. The downlink service packet is a packet that is received by the terminal from the external service network via the network device, for example, a signaling packet and a data packet that are sent by a server in the external service network.

S302. The network device determines a service traffic feature based on session information of the terminal and packet information of the service packet.

S302 may be performed by the processor 21 shown in FIG. 2.

The service traffic feature includes at least one of session duration, a quantity of concurrent sessions, a traffic rate, traffic rate stability, a packet transmit/receive frequency, a quantity of packets, a packet length, and a round-trip time related to a request packet and a response packet.

For example, a session refers to a communication connection between the terminal and a service network. The quantity of concurrent sessions is a quantity of connections between a same terminal and the service network, and may include a quantity of uplink concurrent sessions and a quantity of downlink concurrent sessions. The session duration is a time period from a session start time to a session end time. The session start time may be a time at which the terminal sends a session establishment request packet to a network device or a terminal in the service network. The session end time may be a time at which the terminal receives a protocol packet for terminating a current session or a time at which the terminal receives the last data packet that carries service data.

For example, traffic refers to a data volume transmitted between the terminal and the service network, and may be measured using indicators such as a quantity of bytes or a quantity of bits. The traffic rate refers to a data volume of service packets received or sent by the terminal within a specified time period, includes an uplink traffic rate and a downlink traffic rate, and may be measured in a quantity of bytes or bits received or sent per unit time. The traffic rate stability refers to stability of a traffic rate, for example, may be measured in a variance of traffic rates measured at a plurality of time points within a specified time period.

For example, the packet is a data packet transmitted between the terminal and the service network, and includes a signaling packet and a data packet. The packet quantity may include a quantity of uplink large packets, a quantity of downlink large packets, a quantity of uplink small packets, a quantity of downlink small packets, and a total quantity of all received and sent packets. The packet length refers to a size of the service packet, and is usually measured in a quantity of bytes or bits. Similarly, a first packet ratio is a ratio of the quantity of downlink large packets to a total quantity of downlink packets, and a second packet ratio is a ratio of the quantity of downlink small packets to a total quantity of downlink packets. A large packet may usually be a packet whose packet length is greater than a first packet length threshold, a small packet may be a packet whose packet length is less than a second packet length threshold, and the second packet length threshold is less than the first packet length threshold. The packet transmit/receive frequency refers to a quantity of packets received and/or sent within a specified time period, for example, may be measured in a quantity of packets received and sent per unit time. The round-trip time refers to a time delay from sending a service request packet by the terminal to receiving a response packet of the service request packet by the terminal.

In addition, the service traffic feature further includes at least one of a service occurrence time period, a service occurrence place, and a frequently used service type of the terminal. The service occurrence time period may be any time period in a day, for example, in the early morning, morning, noon, afternoon, and night. The frequently used service type of the terminal is a service type that is frequently used by the terminal or used for a relatively long time in a past period of time. For example, if a user often uses a terminal to play an online game or perform BT downloading, frequently used service types corresponding to the terminal include an online game service and a BT download service. The service occurrence place may usually include a family and a public small LAN, for example, an internet cafe or a school.

S303. The network device determines a service type of the to-be-identified service based on the service traffic feature.

The network device may perform S303 using the processor 21 shown in FIG. 2.

Figure 4:
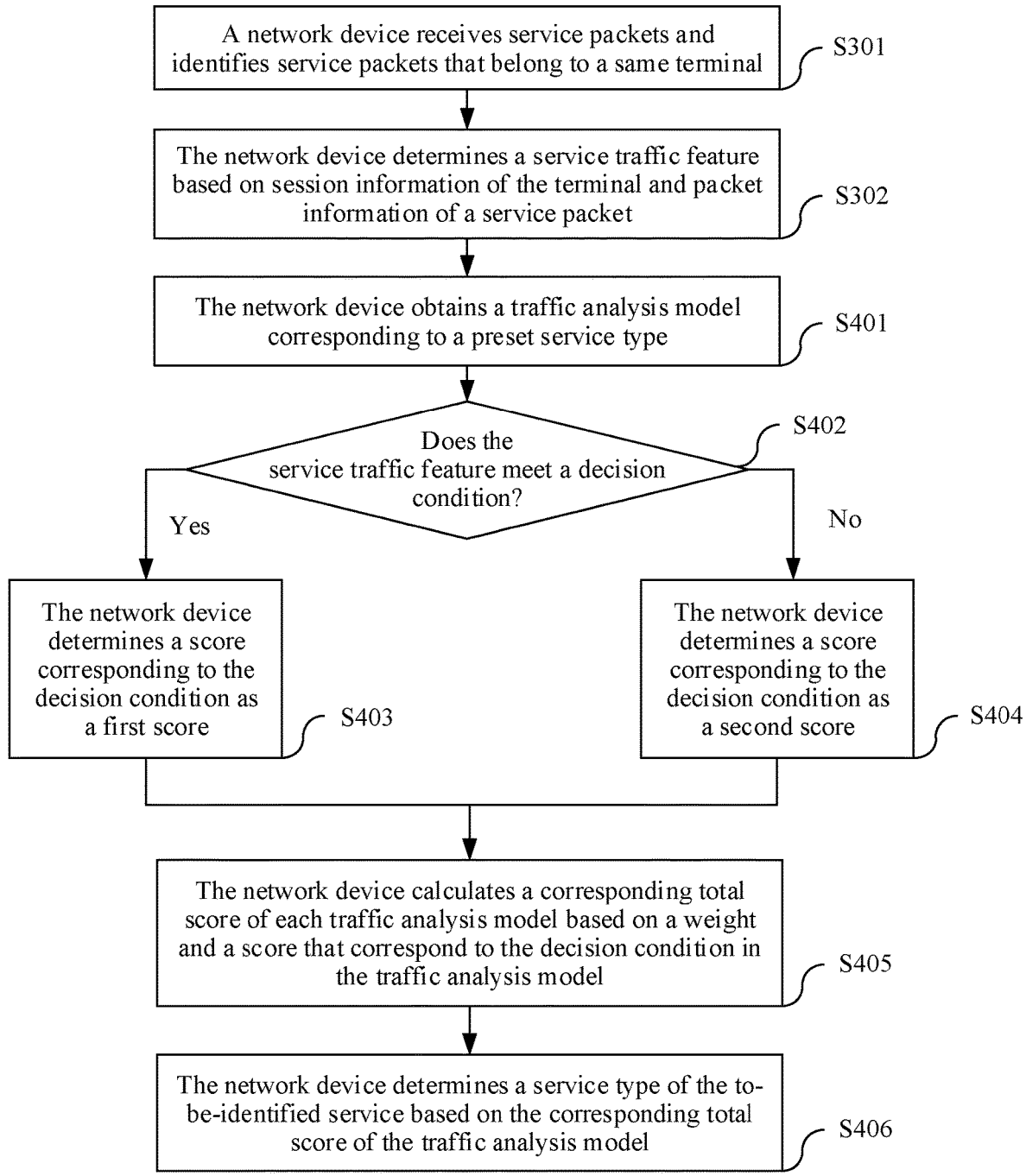
FIG. 4 is a schematic flowchart of another service identification method according to an embodiment of this application.

In a possible design, as shown in FIG. 4, S303 in which the network device determines the service type of the to-be-identified service based on the service traffic feature includes S401 to S406.

S401. The network device obtains a traffic analysis model corresponding to a preset service type.

The traffic analysis model includes a decision condition for the service traffic feature and a weight corresponding to the decision condition. The weight is used to indicate a probability that the preset service type meets the corresponding decision condition.

In actual application, the preset service type may be a service type that has been launched or a service type that has not been launched, including but not limited to a voice service, a VOD service, an online game service, a BT download service, and a web browsing service.

It may be understood that the traffic analysis model may be stored in a traffic analysis model configuration file locally configured by the network device, or may be embedded in program code for performing the service type identification method provided in this embodiment of this application. This is not limited in this embodiment of this application.

For each preset service type, a plurality of traffic analysis models may be preset, and selection may be performed according to an actual situation. Each preset traffic analysis model usually includes a plurality of decision conditions and weights corresponding to the decision conditions. The weight represents a probability that when a service traffic feature of the to-be-identified service meets the decision condition, a service type of the to-be-identified service is a preset service type corresponding to the traffic analysis model. For example, when a decision condition with a relatively high priority is used to determine whether a service type of the to-be-identified service is a preset service type corresponding to the traffic analysis model, high accuracy is implemented. That is, if the decision condition with a relatively high priority is met, a probability that the service type of the to-be-identified service is the preset service type corresponding to the service traffic feature model is relatively high. Therefore, configuring a corresponding weight for a decision condition based on a priority of the decision condition helps improve accuracy of identifying a service type.

As shown in Table 1A, a traffic analysis model corresponding to the BT download service include decision conditions 1 to 4 and weights corresponding to the decision conditions. The decision condition 1 has the highest priority, and priorities of the decision conditions 2 to 4 are lower. Therefore, a weight configured for the decision condition 1 is 0.5, and is greater than weights of 0.1 configured for the decision conditions 2 to 4.

TABLE 1A

| No. | Decision condition | Weight |
|---|---|---|
| 1 | The downlink traffic rate is greater than a preset first rate threshold, and the quantity of uplink concurrent sessions is greater than a preset session quantity threshold | 0.5 |
| 2 | The session duration is greater than a preset duration threshold | 0.1 |
| 3 | A value of downlink traffic rate stability is greater than a preset stability threshold | 0.1 |
| 4 | The uplink traffic rate is less than a preset second rate threshold, and the second rate threshold is less than the first rate threshold | 0.1 |

On the basis of Table 1A, to further improve accuracy of identifying a BT download service, optionally, the decision conditions in the traffic analysis model corresponding to the BT download service further include at least one of decision conditions 5 and 6 shown in Table 1B.

TABLE 1B

| No. | Decision condition | Weight |
|---|---|---|
| 1 | The downlink traffic rate is greater than a preset first rate threshold, and the quantity of uplink concurrent sessions is greater than a preset session quantity threshold | 0.5 |
| 2 | The session duration is greater than a preset duration threshold | 0.1 |
| 3 | A value of downlink traffic rate stability is greater than a preset stability threshold | 0.1 |

TABLE 1B-continued

| No. | Decision condition | Weight |
|---|---|---|
| 4 | The uplink traffic rate is less than a preset second rate threshold, and the second rate threshold is less than the first rate threshold | 0.1 |
| 5 | The service occurrence time period is in the early morning | 0.05 |
| 6 | The frequently used service types of the terminal include a BT download service | 0.05 |

To improve accuracy of the decision condition, and further improve service identification accuracy, with reference to Table 1B, as shown in Table 1C and Table 1D, for each decision condition, a first score may be further configured when the decision condition is met. It should be noted that values of first scores corresponding to different decision conditions may be the same or different.

For example, as shown in Table 1C, first scores corresponding to all decision conditions are configured as 100.

TABLE 1C

| No. | Decision condition | Weight | First score |
|---|---|---|---|
| 1 | The downlink traffic rate is greater than a preset first rate threshold, and the quantity of uplink concurrent sessions is greater than a preset session quantity threshold | 0.5 | 100 |
| 2 | The session duration is greater than a preset duration threshold | 0.1 | 100 |
| 3 | A value of downlink traffic rate stability is greater than a preset stability threshold | 0.1 | 100 |
| 4 | The uplink traffic rate is less than a preset second rate threshold | 0.1 | 100 |
| 5 | The service occurrence time period is in the early morning | 0.05 | 100 |
| 6 | The frequently used service types of the terminal include a BT download service | 0.05 | 100 |

Optionally, to improve accuracy of the decision condition and further improve service identification accuracy, first scores that are positively correlated with priorities of the decision conditions may be configured for the decision conditions. For example, with reference to Table 1B, as shown in Table 1D, a first score corresponding to the decision condition 1 is 100, and is greater than first scores of 20 corresponding to the decision conditions 2 to 4.

TABLE 1D

| No. | Decision condition | Weight | First score |
|---|---|---|---|
| 1 | The downlink traffic rate is greater than a preset first rate threshold, and the quantity of uplink concurrent sessions is greater than a preset session quantity threshold | 0.5 | 100 |
| 2 | The session duration is greater than a preset duration threshold | 0.1 | 20 |
| 3 | A value of downlink traffic rate stability is greater than a preset stability threshold | 0.1 | 20 |
| 4 | The uplink traffic rate is less than a preset second rate threshold, and the second rate threshold is less than the first rate threshold | 0.1 | 20 |
| 5 | The service occurrence time period is in the early morning | 0.05 | 5 |
| 6 | The frequently used service types of the terminal include a BT download service | 0.05 | 5 |

Further, to improve accuracy of the decision condition, and further improve service identification accuracy, in addition to the decision conditions, the weights corresponding to the decision conditions, and the first scores configured when the decision conditions are met, the service traffic analysis model may further include second scores configured when the decision conditions are not met. The second score is usually less than the first score. For example, the first score may be configured as a multiple, greater than or equal to 2, of the second score, or the second score may be configured as 0. For example, with reference to Table 1D, as shown in Table 1E, for the service traffic analysis model corresponding to the BT download service, the first score of 100 configured when the decision condition 1 is met is greater than a second score of 2 configured when the decision condition 1 is not met.

TABLE 1E

| No. | Decision condition | Weight | First score | Second score |
|---|---|---|---|---|
| 1 | The downlink traffic rate is greater than a preset first rate threshold, and the quantity of uplink concurrent sessions is greater than a preset session quantity threshold | 0.5 | 100 | 2 |
| 2 | The session duration is greater than a preset duration threshold | 0.1 | 20 | 2 |
| 3 | A value of downlink traffic rate stability is greater than a preset stability threshold | 0.1 | 20 | 2 |
| 4 | The uplink traffic rate is less than a preset second rate threshold, and the second rate threshold is less than the first rate threshold | 0.1 | 20 | 2 |
| 5 | The service occurrence time period is in the early morning | 0.05 | 5 | 2 |
| 6 | The frequently used service types of the terminal include a BT download service | 0.05 | 5 | 2 |

It should be noted that when a decision condition with a high priority is not met, a probability that the service type of the to-be-identified service is the preset service type corresponding to the service traffic analysis model is comparatively low. That is, there is a high probability that the service type of the to-be-identified service is another service type different from the preset service type corresponding to the service traffic analysis model. Therefore, to improve accuracy of the decision condition and further improve service identification accuracy, optionally, a smaller second score may be configured when a decision condition with a high priority is not met, and a larger second score may be configured when a decision condition with a low priority is not met, to improve service identification accuracy.

For example, with reference to Table 1B, as shown in Table 1F, a priority of the decision condition 1 is higher, and a priority of the decision condition 5 is lower. Therefore, when neither the decision condition 1 nor the decision condition 5 is met, a second score configured for the decision condition 1 is 0, and is less than a second score of 1 configured for the decision condition 5.

TABLE 1F

| No. | Decision condition | Weight | First score | Second score |
|---|---|---|---|---|
| 1 | The downlink traffic rate is greater than a preset first rate threshold, and the quantity of uplink concurrent sessions is greater than a preset session quantity threshold | 0.5 | 100 | 0 |
| 2 | The session duration is greater than a preset duration threshold | 0.1 | 20 | 1 |

TABLE 1F-continued

| No. | Decision condition | Weight | First score | Second score |
|-----|-------------------|--------|-------------|--------------|
| 3 | A value of downlink traffic rate stability is greater than a preset stability threshold | 0.1 | 20 | 1 |
| 4 | The uplink traffic rate is less than a preset second rate threshold, and the second rate threshold is less than the first rate threshold | 0.1 | 20 | 1 |
| 5 | The service occurrence time period is in the early morning | 0.05 | 5 | 2 |
| 6 | The frequently used service types of the terminal include a BT download service | 0.05 | 5 | 2 |

It should be noted that the decision conditions in Tables 1A to 1F, and the weights, the first scores, and the second scores that correspond to the decision conditions may be set or adjusted according to an actual situation. For example, service traffic features of various service types may be collected in advance, and then a corresponding decision condition, a weight corresponding to the decision condition, a first score, and a second score are set for each service type based on degrees of distinction of the service traffic features corresponding to the different service types.

For example, Tables 2 to 4 sequentially provide service traffic analysis models corresponding to three preset service types: a VOD service, a voice service, and an online game service. Similar to the service traffic analysis model corresponding to the BT download service, the three service traffic analysis models each include a plurality of decision conditions corresponding to the preset service type, and weights, first scores, and second scores that correspond to the decision conditions. It may be understood that, similar to the service traffic analysis model corresponding to the BT download service, in the service traffic analysis models corresponding to Tables 2 to 4, the decision conditions, the weights corresponding to the decision conditions, the first scores, and the second scores may be set or adjusted according to an actual situation.

As shown in Table 2, the decision conditions in the traffic analysis model corresponding to the VOD service include decision conditions 1 to 5 shown in Table 2. The downlink traffic rate is greater than the preset first rate threshold, and the quantity of uplink concurrent sessions is less than the preset session quantity threshold, the first packet ratio is greater than a preset first packet ratio threshold, where the first packet ratio is the ratio of the quantity of downlink large packets to the total quantity of downlink packets, the uplink traffic rate is less than the preset second rate threshold, the session duration is greater than the preset duration threshold, or the value of the downlink traffic rate stability is less than the preset stability threshold. Because an uplink traffic rate in an existing network is usually less than a downlink traffic rate, the second rate threshold may be set to a value less than the first rate threshold.

In addition, the service traffic feature further includes a service occurrence time period. Optionally, to further improve accuracy of identifying a VOD service, the decision conditions in the traffic analysis model corresponding to the VOD service further include a decision condition 6 shown in Table 2. The service occurrence time period is in the night. The night time period may be set to 19:00-23:00.

TABLE 2

| No. | Decision condition | Weight | First score | Second score |
|-----|-------------------|--------|-------------|--------------|
| 1 | The downlink traffic rate is greater than the preset first rate threshold, and the quantity of uplink concurrent sessions is less than the preset session quantity threshold | 0.2 | 40 | 0 |
| 2 | The first packet ratio is greater than a preset first packet proportion threshold | 0.2 | 40 | 0 |
| 3 | The uplink traffic rate is less than a preset second rate threshold | 0.1 | 20 | 5 |
| 4 | The session duration is greater than a preset duration threshold | 0.1 | 20 | 5 |
| 5 | The value of the downlink traffic rate stability is less than the preset stability threshold | 0.1 | 20 | 5 |
| 6 | The service occurrence time period is in the night | 0.05 | 5 | 1 |

As shown in Table 3, the decision conditions in the traffic analysis model corresponding to the voice service include decision conditions 1 to 5 shown in Table 3. The uplink packet transmit frequency is greater than a preset frequency threshold, the downlink traffic rate is less than a preset third rate threshold, and the second packet ratio is greater than a preset second packet ratio threshold, a value of the round-trip time is less than a preset delay threshold, the quantity of uplink concurrent sessions is less than the preset session quantity threshold, or the value of the downlink traffic rate stability is less than the preset stability threshold. The third rate threshold is less than the first rate threshold, and the second packet ratio is the ratio of the quantity of downlink small packets to the total quantity of downlink packets.

TABLE 3

| No. | Decision condition | Weight | First score | Second score |
|-----|-------------------|--------|-------------|--------------|
| 1 | The uplink packet transmit frequency is greater than a preset frequency threshold | 0.3 | 60 | 0 |
| 2 | The downlink traffic rate is less than a preset third rate threshold, and the second packet ratio is greater than a preset second packet ratio threshold | 0.2 | 40 | 0 |
| 3 | A value of the round-trip time is less than a preset delay threshold | 0.1 | 20 | 5 |
| 4 | The quantity of uplink concurrent sessions is less than the preset threshold | 0.1 | 20 | 5 |
| 5 | The value of the downlink traffic rate stability is less than the preset stability threshold | 0.1 | 20 | 5 |

As shown in Table 4, the decision conditions in the traffic analysis model corresponding to the online game service include decision conditions 1 to 5 shown in Table 4. The downlink traffic rate is less than the preset third rate threshold, and the second packet ratio is greater than the preset second packet ratio threshold, the uplink packet transmit frequency is less than the preset frequency threshold, the value of the round-trip time is less than the preset delay threshold, the quantity of uplink concurrent sessions is less than the preset session quantity threshold, and the value of the downlink traffic rate stability is less than the preset stability threshold. The third rate threshold is less than the first rate threshold, and the second packet ratio is the ratio of the quantity of downlink small packets to the total quantity of downlink packets.

In addition, the service traffic feature further includes the service occurrence place and the frequently used service type of the terminal. Therefore, optionally, to further improve accuracy of identifying an online game service, the decision conditions in the traffic analysis model corresponding to the online game service further include at least one of decision conditions 6 and 7 shown in Table 4. The service occurrence place is a commercial small LAN, or frequently used service types of the terminal include an online game service.

TABLE 4

| No. | Decision condition | Weight | First score | Second score |
|-----|---|---|---|---|
| 1 | The downlink traffic rate is less than a preset third rate threshold, and the second packet ratio is greater than a preset second packet ratio threshold | 0.3 | 60 | 0 |
| 2 | The uplink packet transmit frequency is less than the preset frequency threshold | 0.2 | 40 | 0 |
| 3 | The value of the round-trip time is less than the preset delay threshold | 0.1 | 20 | 5 |
| 4 | The quantity of uplink concurrent sessions is less than the preset threshold | 0.1 | 20 | 5 |
| 5 | The value of the downlink traffic rate stability is less than the preset stability threshold | 0.1 | 20 | 5 |
| 6 | The service occurrence place is a small commercial LAN. | 0.05 | 5 | 1 |
| 7 | Frequently used service types of the terminal include an online game service. | 0.05 | 5 | 1 |

S402. For each decision condition in the traffic analysis model, the network device determines whether the service traffic feature meets the decision condition.

If the service traffic feature meets the decision condition, the network device performs the following step S403. If the service traffic feature does not meet the decision condition, the network device performs the following step S404.

S403. The network device determines a score corresponding to the decision condition as the first score.

S404. The network device determines a score corresponding to the decision condition as the second score.

S405. The network device calculates a corresponding total score of the traffic analysis model based on the weight and the score that correspond to the decision condition in the traffic analysis model.

The corresponding total score of the traffic analysis model is calculated according to the following formula:

$$S_i = \sum_{j=1}^{N} (s_{i,j} \times \alpha_{i,j}),$$

where $S_i$ is a total score of an $i^{th}$ traffic analysis model, $s_{i,j}$ is a score of a $i^{th}$ decision condition in the $i^{th}$ traffic analysis model, $\alpha_{i,j}$ is a weight of the $i^{th}$ decision condition in the $i^{th}$ traffic analysis model, $1 \leq i \leq M$, $1 \leq j \leq N$, and both M and N are natural numbers greater than or equal to 2.

For example, if a traffic feature of the terminal meets all the decision conditions shown in Table 1E, a total score of the traffic analysis model of the BT download service is $S_i=0.5\times100+0.1\times20+0.1\times20+0.1\times20+0.05\times5+0.05\times5=56.5$, if a traffic feature of the terminal meets none of the decision conditions shown in Table 1E, a total score of the traffic analysis model of the BT download service is $S_i=0.5\times0+0.1\times0+0.1\times0+0.1\times0+0.05\times1+0.05\times1=0.1$.

In actual application, determining may be performed using a decision condition with a relatively large weight shown in Table 1E, or using all the decision conditions shown in Table 1E. This is not limited in this embodiment of this application.

S406. The network device determines the service type of the to-be-identified service based on the corresponding total score of the traffic analysis model.

Figure 5:
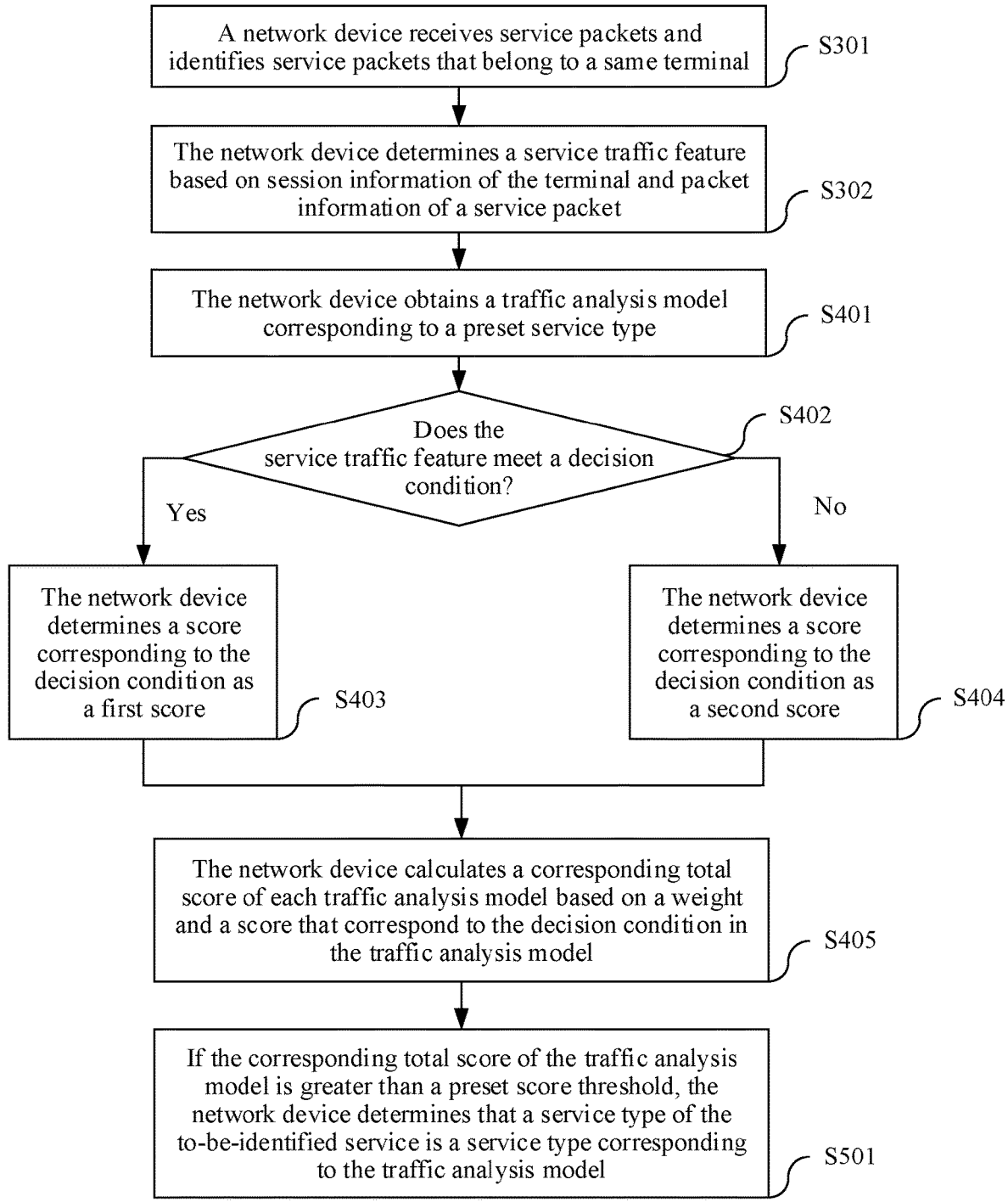
FIG. 5 is a schematic flowchart of still another service identification method according to an embodiment of this application.

Optionally, as shown in FIG. 5, in a case of determining whether the to-be-identified service is a specific preset service type, the network device may locally store only a service traffic analysis model corresponding to the preset service type, and S406 may be implemented as S501.

S501. If the corresponding total score of the traffic analysis model is greater than a preset score threshold, the network device determines that the service type of the to-be-identified service is a service type corresponding to the traffic analysis model.

The preset score threshold may be set or adjusted according to an actual situation. For service traffic analysis models corresponding to different preset service types, a same score threshold or different score thresholds may be set. For example, score thresholds configured for the traffic analysis model of the BT download service, the traffic analysis model of the VOD service, the traffic analysis model of the voice service, and the traffic analysis model of the online game service shown in Tables 1 to 4 may be 50, 16, 26, and 26 respectively (a sum of products of first scores corresponding to decision conditions of a weight greater than 0.1 multiplied by respective weights).

For example, if the service traffic feature of the terminal meets the decision conditions 1 to 4 shown in Table 1E, the corresponding total score of the terminal is 56, which is greater than a score threshold of 50 of the traffic analysis model corresponding to the BT download service. In this case, the network device accordingly determines that the service type of the to-be-identified service is a BT download service.

For example, if the service traffic feature of the terminal does not meet the decision conditions 1 to 5 shown in Table 4, the total score of the service traffic analysis model is 1.5, which is less than a score threshold of 26 of the traffic analysis model corresponding to the online game service. In this case, the network device accordingly determines that the service type of the to-be-identified service is not an online game service.

It should be noted that, because there is only one preset service traffic analysis model, a determining result the service type of the to-be-identified service can only be that the service type of the to-be-identified service is the preset service type corresponding to the service traffic analysis model or not.

Figure 6:
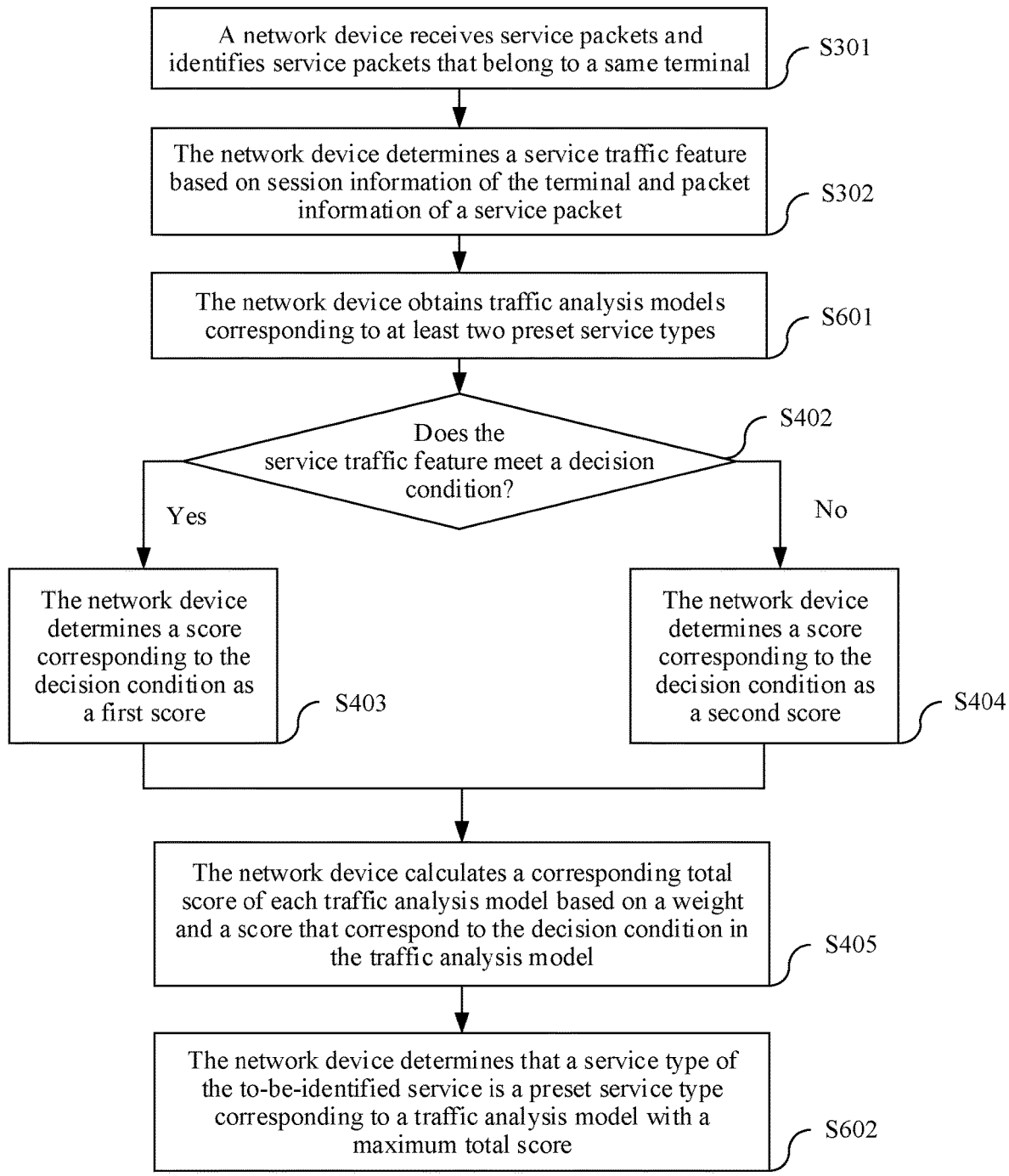
FIG. 6 is a schematic flowchart of yet another service identification method according to an embodiment of this application.

Optionally, as shown in FIG. 6, when the network device locally stores a plurality of service traffic analysis models, and the network device may determine whether the service type of the to-be-identified service is one of a plurality of preset service types, S401 includes S601.

S601. The network device obtains traffic analysis models corresponding to at least two preset service types.

The preset service types are in a one-to-one correspondence with the traffic analysis models, and the obtained traffic analysis models may be selected according to an actual situation. For example, when the terminal is an STB that usually does not support a voice service, the traffic analysis models obtained by the network device may not include the traffic analysis model shown in Table 3.

Correspondingly, S406 in which the network device determines the service type of the to-be-identified service based on the corresponding total score of the traffic analysis model includes S602.

S602. The network device determines that the service type of the to-be-identified service is a preset service type corresponding to a traffic analysis model with a maximum total score.

Further, the network device assumes that the service type of the to-be-identified service is one of the preset service types corresponding to the traffic analysis models obtained in S601. The network device calculates total scores of the traffic analysis models according to the method in S405, and selects a preset service type corresponding to a traffic analysis model with a maximum total score as the service type of the to-be-identified service.

For example, as shown in Table 5, if the traffic feature of the terminal meets the decision conditions 1 to 4 shown in Table 1E, the decision conditions 2 to 4 shown in Table 2, and the decision condition 2 shown in Table 4, total scores of the traffic analysis models shown in Tables 1 to 4 are 56, 12, 0, and 8 respectively. In this case, the network device determines that the service type of the to-be-identified service is the BT download service corresponding to the traffic analysis model with a maximum total score.

TABLE 5

| Traffic analysis model | Total score | Decision conditions that are met |
| --- | --- | --- |
| BT download service | 56 | 1, 2, 3, and 4 |
| VOD service | 12 | 2, 3, and 4 |
| Voice service | 0 | None |
| Online game service | 8 | 2 |

According to the service identification method in this embodiment of this application, the network device can determine, through analysis on the session information of the terminal and the packet information of the service packet, a traffic feature of a service currently accessed by the terminal, and then can determine a service type of the to-be-identified service based on the service traffic feature. It can be learned that the network device does not need to perform complex parsing on the service packet, so that service identification efficiency can be improved. This is mainly reflected in the following aspects. 1. For a newly added service, the network device does not need to be upgraded for a capability of parsing a new network transmission protocol used by the newly added service, but only needs to establish a relatively simple service traffic analysis model for the newly added service to identify the newly added service. This can reduce deployment costs of the small LAN. 2. For a service packet encapsulated using an encryption protocol or a proprietary protocol, the network device can identify a traffic feature of a service and determine a service type of the to-be-identified service without parsing the service packet based on the encryption protocol or the proprietary protocol. 3. For another service packet that masquerades as an HTTP protocol packet using port information, a traffic feature of a service can be identified and a service type of the to-be-identified service can be determined without performing a complex parsing step such as application layer encapsulation information parsing on the service packet. 4. For a VOD service and a web browsing service with a same destination address, traffic features can be used for identification to avoid mistaken determining. In addition, according to the method, the terminal does not need to have a capability of adding service identification information to a packet. Therefore, the method can be applied to any type of terminal.

In the embodiments of this application, a service type identification apparatus may be divided into function modules based on the foregoing method examples. For example, the function modules may be obtained through division based on the corresponding functions, or two or more functions may be integrated into one processing module. The integrated module may be implemented in a form of hardware, or may be implemented in a form of a software function module. It should be noted that, in the embodiments of this application, module division is an example, and is merely a logical function division. In actual implementation, another division manner may be used.

Figure 7:
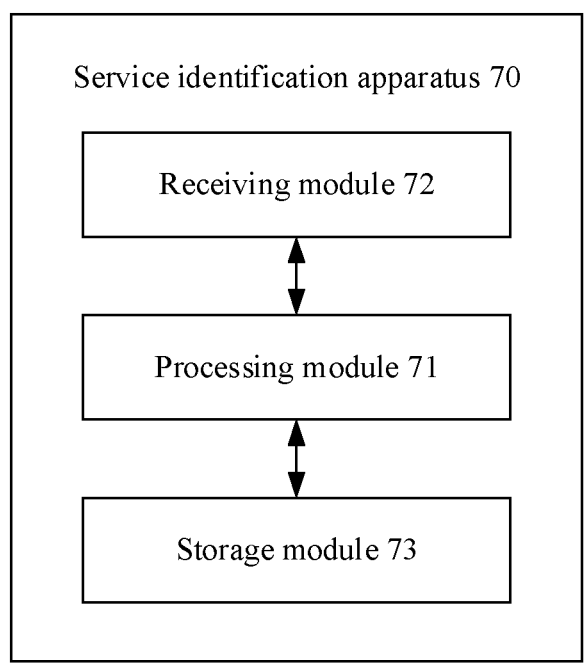
FIG. 7 is a schematic structural diagram of a service identification apparatus according to an embodiment of this application.

FIG. 7 is a possible schematic structural diagram of a service identification apparatus 70 in the foregoing embodiment. As shown in FIG. 7, the service identification apparatus 70 may be applied to a small network device such as the home gateway 11 shown in FIG. 1. The apparatus 70 includes a processing module 71 and a receiving module 72.

The processing module 71 is configured to control and manage an action of the apparatus 70. For example, the processing module 71 is configured to support the apparatus 70 in performing S302 and S303 in FIG. 3, and/or is configured to perform other steps in the technical solutions described in this specification. The receiving module 72 is configured to support communication between the apparatus 70 and an external service network or a terminal in a home network, for example, support communication between the television set 13 connected to an STB and a VOD server in the external service network. In addition, the apparatus 70 further includes a storage module 73 configured to store a related instruction and a service packet.

All related content of the steps in the foregoing method embodiment may be cited in function descriptions of corresponding function modules in the apparatus 70 shown in FIG. 7. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service identification method implemented by a network device, wherein the service identification method comprises:
   receiving first service packets;
   identifying, from among the first service packets, second service packets that belong to a terminal;
   determining a service traffic feature based on session information of the terminal and packet information of the second service packets, wherein the service traffic feature comprises at least one of a session duration, a quantity of concurrent sessions, a traffic rate, a traffic rate stability, a packet transmit/receive frequency, a quantity of packets, a packet length or a round-trip time related to a request packet and a response packet; and
   determining a service type of a to-be-identified service based on the service traffic feature, wherein determining the service type comprises:
      obtaining a traffic analysis model corresponding to a preset service type, wherein the traffic analysis model comprises a decision condition for the service traffic feature and a weight corresponding to the decision condition;

determining a score of the decision condition based on a first score corresponding to the decision condition when the service traffic feature meets the decision condition;

determining the score of the decision condition based on a second score corresponding to the decision condition when the service traffic feature does not meet the decision condition;

calculating a corresponding total score of the traffic analysis model based on the weight and the score of the decision condition; and determining the service type of the to-be-identified service based on the corresponding total score.

2. The service identification method of claim 1, wherein calculating the corresponding total score of the traffic analysis model comprises using a first formula, wherein the first formula comprises:

$$S_i = \sum_{j=1}^{N} (s_{i,j} \times \alpha_{i,j}),$$

wherein $S_i$ is a total score of an $i^{th}$ traffic analysis model, wherein $S_{i,j}$ is a score of a $j^{th}$ decision condition in the $i^{th}$ traffic analysis model, wherein $\alpha_{i,j}$ is a weight of the $j^{th}$ decision condition in the $i^{th}$ traffic analysis model, wherein 1≤i≤M, wherein 1≤j≤N, and wherein M and N are natural numbers greater than or equal to 2.

3. The service identification method of claim 2, further comprising determining that the service type of the to-be-identified service corresponds to the traffic analysis model when the corresponding total score of the traffic analysis model is greater than a preset score threshold.

4. The service identification method of claim 2, further comprising:

obtaining traffic analysis models corresponding to at least two preset service types, wherein the at least two preset service types are in a one-to-one correspondence with the traffic analysis models; and determining that the service type of the to-be-identified service is a preset service type corresponding to a traffic analysis model with a maximum total score.

5. The service identification method of claim 2, wherein the traffic rate comprises a downlink traffic rate and an uplink traffic rate, wherein the quantity of concurrent sessions comprises a quantity of uplink concurrent sessions, wherein the traffic rate stability comprises downlink traffic rate stability, wherein the service type comprises a bit torrent (BT) download service, and wherein a decision condition in a traffic analysis model corresponding to the BT download service comprises that:

the downlink traffic rate is greater than a preset first rate threshold, and the quantity of uplink concurrent sessions is greater than a preset session quantity threshold;

the session duration is greater than a preset duration threshold;

a value of the downlink traffic rate stability is greater than a preset stability threshold; and the uplink traffic rate is less than a preset second rate threshold, and the second rate threshold is less than the first rate threshold.

6. The service identification method of claim 5, wherein the service traffic feature further comprises a service occurrence time period and a frequently used service type of the terminal, and wherein the decision condition in the traffic analysis model corresponding to the BT download service further comprises at least one of:

the service occurrence time period is in an early morning; or the frequently used service type of the terminal comprises the BT download service.

7. The service identification method of claim 2, wherein the traffic rate comprises a downlink traffic rate and an uplink traffic rate, wherein the quantity of concurrent sessions comprises a quantity of uplink concurrent sessions, wherein the traffic rate stability comprises downlink traffic rate stability, wherein the quantity of packets comprises a quantity of downlink large packets and a total quantity of downlink packets, wherein the downlink large packet comprises a packet length greater than a preset first packet length threshold, wherein the service type comprises a video on demand (VOD) service, and wherein a decision condition for a traffic analysis model corresponding to the VOD service comprises that:

the downlink traffic rate is greater than a preset first rate threshold, and the quantity of uplink concurrent sessions is less than a preset session quantity threshold;

a first packet ratio is greater than a preset first packet ratio threshold, wherein the first packet ratio is the quantity of downlink large packets to the total quantity of downlink packets;

the uplink traffic rate is less than a preset second rate threshold, and the second rate threshold is less than the first rate threshold;

the session duration is greater than a preset duration threshold; and a value of the downlink traffic rate stability is less than a preset stability threshold.

8. The service identification method of claim 2, wherein the packet transmit/receive frequency comprises an uplink packet transmit frequency, wherein the traffic rate comprises a downlink traffic rate and an uplink traffic rate, wherein the quantity of concurrent sessions comprises a quantity of uplink concurrent sessions, wherein the traffic rate stability comprises downlink traffic rate stability, wherein the quantity of packets comprises a quantity of downlink small packets and a total quantity of downlink packets, wherein the downlink small packet comprises a packet length less than a preset second packet length threshold, wherein the second packet length threshold is less than a first packet length threshold, wherein the service type comprises a voice service, and wherein a decision condition for a traffic analysis model corresponding to the voice service comprises that:

the uplink packet transmit frequency is greater than a preset frequency threshold;

the downlink traffic rate is less than a preset third rate threshold, and a second packet ratio is greater than a preset second packet ratio threshold, wherein the second packet ratio is the quantity of downlink small packets to the total quantity of downlink packets;

a value of the round-trip time is less than a preset delay threshold;

the quantity of uplink concurrent sessions is less than a preset session quantity threshold; or a value of the downlink traffic rate stability is less than a preset stability threshold.

9. The service identification method of claim 2, wherein the traffic rate comprises a downlink traffic rate and an uplink traffic rate, wherein the packet transmit/receive frequency comprises an uplink packet transmit frequency, wherein the quantity of concurrent sessions comprises a quantity of uplink concurrent sessions, wherein the traffic rate stability comprises downlink traffic rate stability, wherein the quantity of packets comprises a quantity of downlink small packets and a total quantity of downlink packets, wherein the downlink small packet is a downlink packet whose packet length is less than a preset second packet length threshold, wherein the service type comprises an online game service, and wherein a decision condition for a traffic analysis model corresponding to the online game service comprises that:
the downlink traffic rate is less than a preset third rate threshold, and a second packet ratio is greater than a preset second packet ratio threshold, wherein the second packet ratio is a ratio of the quantity of downlink small packets to the total quantity of downlink packets;
the uplink packet transmit frequency is less than a preset frequency threshold;
a value of the round-trip time is less than a preset delay threshold;
the quantity of uplink concurrent sessions is less than a preset session quantity threshold; and
a value of the downlink traffic rate stability is less than a preset stability threshold.

10. A service identification apparatus comprising:
a memory configured to store computer-executable instructions;
a processor coupled to the memory, wherein the computer-executable instructions cause the processor to be configured to:
receive first service packets;
identify, from among the first service packets, second service packets that belong to a terminal;
determine a service traffic feature based on session information of the terminal and packet information of the second service packets, wherein the service traffic feature comprises at least one of a session duration, a quantity of concurrent sessions, a traffic rate, a traffic rate stability, a packet transmit/receive frequency, a quantity of packets, a packet length, or a round-trip time related to a request packet and a response packet; and
determine a service type of a to-be-identified service based on the service traffic feature, wherein the instructions that cause the processor to be configured to determine the service type comprise instructions that cause the processor to be configured to:
obtain a traffic analysis model corresponding to a preset service type, wherein the traffic analysis model comprises a decision condition for the service traffic feature and a weight corresponding to the decision condition;
determine a score of the decision condition based on a first score corresponding to the decision condition when the service traffic feature meets the decision condition;
determine the score of the decision condition based on a second score corresponding to the decision condition when the service traffic feature does not meet the decision condition;
calculate a corresponding total score of the traffic analysis model based on the weight and the score of the decision condition; and
determine the service type of the to-be-identified service based on the corresponding total score of the traffic analysis model.

11. The service identification apparatus of claim 10, wherein the computer-executable instructions further cause the processor to be configured to
calculate the corresponding total score of the traffic analysis using a first formula, wherein the first formula comprises:

$$S_i = \sum_{j=1}^{N} (s_{i,j} \times \alpha_{i,j}),$$

wherein $S_i$ is a total score of an $i^{th}$ traffic analysis model, wherein $S_{i,j}$ is a score of a $j^{th}$ decision condition in the $i^{th}$ traffic analysis model, wherein $\alpha_{i,j}$ is a weight of the $j^{th}$ decision condition in the $i^{th}$ traffic analysis model, wherein $1 \leq i \leq M$, wherein $1 \leq j \leq N$, and wherein M and N are natural numbers greater than or equal to 2.

12. The service identification apparatus of claim 11, wherein the computer-executable instructions further cause the processor to be configured to determine that the service type of the to-be-identified service corresponds to the traffic analysis model when the corresponding total score of the traffic analysis model is greater than a preset score threshold.

13. The service identification apparatus of claim 11, wherein the computer-executable instructions further cause the processor to be configured to:
obtain traffic analysis models corresponding to at least two preset service types, wherein the at least two preset service types are in a one-to-one correspondence with the traffic analysis models; and
determine that the service type of the to-be-identified service is a preset service type corresponding to a traffic analysis model with a maximum total score.

14. The service identification apparatus of claim 11, wherein the traffic rate comprises a downlink traffic rate and an uplink traffic rate, wherein the quantity of concurrent sessions comprises a quantity of uplink concurrent sessions, wherein the traffic rate stability comprises downlink traffic rate stability, wherein the service type comprises a bit torrent (BT) download service, and wherein a decision condition in a traffic analysis model corresponding to the BT download service comprises that:
the downlink traffic rate is greater than a preset first rate threshold, and the quantity of uplink concurrent sessions is greater than a preset session quantity threshold;
the session duration is greater than a preset duration threshold;
a value of the downlink traffic rate stability is greater than a preset stability threshold; and
the uplink traffic rate is less than a preset second rate threshold, and the second rate threshold is less than the first rate threshold.

15. The service identification apparatus of claim 14, wherein the service traffic feature further comprises a service occurrence time period and a frequently used service type of the terminal, and wherein the decision condition in the traffic analysis model corresponding to the BT download service further comprises at least one of:
the service occurrence time period is in an early morning; or
the frequently used service type of the terminal comprises the BT download service.

16. The service identification apparatus of claim 11, wherein the traffic rate comprises a downlink traffic rate and an uplink traffic rate, wherein the quantity of concurrent sessions comprises a quantity of uplink concurrent sessions, wherein the traffic rate stability comprises downlink traffic rate stability, wherein the quantity of packets comprises a quantity of downlink large packets and a total quantity of downlink packets, wherein the downlink large packet is a downlink packet whose packet length is greater than a preset first packet length threshold, wherein the service type comprises a video on demand (VOD) service, and wherein a decision condition for a traffic analysis model corresponding to the VOD service comprises that:

the downlink traffic rate is greater than a preset first rate threshold, and the quantity of uplink concurrent sessions is less than a preset session quantity threshold;

a first packet ratio is greater than a preset first packet ratio threshold, wherein the first packet ratio is the quantity of downlink large packets to the total quantity of downlink packets;

the uplink traffic rate is less than a preset second rate threshold, and the second rate threshold is less than the first rate threshold;

the session duration is greater than a preset duration threshold; and a value of the downlink traffic rate stability is less than a preset stability threshold.

17. The service identification apparatus of claim 16, wherein the service traffic feature further comprises a service occurrence time period, and wherein the decision condition for the traffic analysis model corresponding to the VOD service further comprises that the service occurrence time period is in a night.

18. The service identification apparatus of claim 11, wherein the traffic rate comprises a downlink traffic rate and an uplink traffic rate, wherein the packet transmit/receive frequency comprises an uplink packet transmit frequency, wherein the quantity of concurrent sessions comprises a quantity of uplink concurrent sessions, wherein the traffic rate stability comprises downlink traffic rate stability, wherein the quantity of packets comprises a quantity of downlink small packets and a total quantity of downlink packets, wherein the downlink small packet comprises a packet length less than a preset second packet length threshold, wherein the service type comprises an online game service, and wherein a decision condition for a traffic analysis model corresponding to the online game service comprises that:

the downlink traffic rate is less than a preset third rate threshold, and a second packet ratio is greater than a preset second packet ratio threshold, wherein the second packet ratio is the quantity of downlink small packets to the total quantity of downlink packets;

the uplink packet transmit frequency is less than a preset frequency threshold;

a value of the round-trip time is less than a preset delay threshold;

the quantity of uplink concurrent sessions is less than a preset session quantity threshold; and a value of the downlink traffic rate stability is less than a preset stability threshold.

19. The service identification apparatus of claim 18, wherein the service traffic feature further comprises a service occurrence place and a frequently used service type of the terminal, and wherein the decision condition for the traffic analysis model corresponding to the online game service further comprises at least one of the following conditions:

the service occurrence place is a public small local area network; or the frequently used service type of the terminal comprises the online game service.

20. A computer program product comprising computer-executable instructions stored on a non-transitory computer-readable medium that, when executed by a processor, cause a network apparatus to:

receive first service packets;

identify, from among the first service packets, second service packets that belong to a terminal;

determine a service traffic feature based on session information of the terminal and packet information of the second service packets, wherein the service traffic feature comprises at least one of a session duration, a quantity of concurrent sessions, a traffic rate, a traffic rate stability, a packet transmit/receive frequency, a quantity of packets, a packet length or a round-trip time related to a request packet and a response packet; and determine a service type of a to-be-identified service based on the service traffic feature, wherein the instructions that cause the network apparatus to determine the service type comprise instructions that cause the network apparatus to:

obtain a traffic analysis model corresponding to a preset service type, wherein the traffic analysis model comprises a decision condition for the service traffic feature and a weight corresponding to the decision condition;

determine a score of the decision condition based on a first score corresponding to the decision condition when the service traffic feature meets the decision condition;

determine the score of the decision condition based on a second score corresponding to the decision condition when the service traffic feature does not meet the decision condition;

calculate a corresponding total score of the traffic analysis model based on the weight and the score of the decision condition; and determine the service type of the to-be-identified service based on the corresponding total score of the traffic analysis model.

* * * * *